(12) United States Patent
Alonso et al.

(10) Patent No.: US 7,092,936 B1
(45) Date of Patent: Aug. 15, 2006

(54) SYSTEM AND METHOD FOR SEARCH AND RECOMMENDATION BASED ON USAGE MINING

(75) Inventors: Omar Alonso, San Mateo, CA (US); Atul Kumar, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 344 days.

(21) Appl. No.: 09/933,905

(22) Filed: Aug. 22, 2001

(51) Int. Cl.
  *G06F 7/00* (2006.01)
  *G06F 17/30* (2006.01)
  *G06F 17/00* (2006.01)

(52) U.S. Cl. ............ 707/3; 707/5; 707/6; 707/102

(58) Field of Classification Search ........ 707/1–6, 707/103 R, 100, 104.1, 102; 706/12
See application file for complete search history.

(56) References Cited

U.S. PATENT DOCUMENTS

| | | | |
|---|---|---|---|
| 5,692,107 A * | 11/1997 | Simoudis et al. | 706/12 |
| 5,983,237 A * | 11/1999 | Jain et al. | 707/104.1 |
| 6,006,225 A * | 12/1999 | Bowman et al. | 707/5 |
| 6,038,560 A * | 3/2000 | Wical | 707/5 |
| 6,169,986 B1 * | 1/2001 | Bowman et al. | 707/5 |
| 6,363,377 B1 * | 3/2002 | Kravets et al. | 707/4 |
| 6,493,702 B1 * | 12/2002 | Adar et al. | 707/3 |
| 6,598,054 B1 * | 7/2003 | Schuetze et al. | 707/103 R |
| 6,687,696 B1 * | 2/2004 | Hofmann et al. | 707/6 |
| 6,732,088 B1 * | 5/2004 | Glance | 707/3 |
| 6,785,671 B1 * | 8/2004 | Bailey et al. | 707/3 |
| 6,836,773 B1 * | 12/2004 | Tamayo et al. | 707/6 |
| 2002/0016786 A1 * | 2/2002 | Pitkow et al. | 707/3 |
| 2002/0103789 A1 * | 8/2002 | Turnbull et al. | 707/3 |
| 2003/0066025 A1 * | 4/2003 | Garner et al. | 715/500 |

OTHER PUBLICATIONS

Raymond Kosala and Hendrik Blockeel (1999), Web Mining Research: A Survey, pp. 1-15.*
Ji-Rong Wen, Jian-Yun Nie and Hong-Jiang Zhang (2001), Clustering User Queries of a Search Engine, pp. 162-168.*
Larry Fitzpatrick and Mei Dent (1997), Automatic Feedback Using Past Queries: Social Searching?, pp. 306-313.*

* cited by examiner

*Primary Examiner*—Frantz Coby
*Assistant Examiner*—Merilyn Nguyen
(74) *Attorney, Agent, or Firm*—Bingham McCutchen LLP (57) ABSTRACT

A method, system, and computer program product for performing searching that generates improved queries, retrieves meaningful and relevant information, and presents the retrieved information to the user in a useful and comprehensive manner is described. The method of searching comprises the steps of: receiving from a user a search query requesting information, retrieving at least one recommendation relating to the search query, generating an expanded query based on the received query, performing a search using the expanded query to retrieve documents, and generating themes relating to the retrieved documents. The at least one recommendation relating to the search query is retrieved from a recommendation database. The recommendation database is generated by performing the steps of: performing data mining using users search query logs, user search patterns, and user profile information to generate a plurality of recommendations relating to search query strings, generating a data structure including the recommendations relating to search query strings, and generating a text index based on information in the data structure.

15 Claims, 11 Drawing Sheets

| 444 | | | | | | | | |
|---|---|---|---|---|---|---|---|---|
| KEY | EQUIVALENCE | R1 | R2 | R3 | R4 | R5 | R6 | R7 |
| XML | XML; EXTENSIBLE MARK-UP LANGUAGE; EXTENSIBLE MARKUP LANGUAGE; EXTENSIBLE MARK UP LANGUAGE | NULL | NULL | NULL | NULL | NULL | NULL | NULL |

Fig. 4e

446 JOB ROLE/ URL TABLE
448 — KEYWORD    VARCHAR2(500)
450 — JOB_ROLE   VARCHAR2(500)
452 — URL        VARCHAR2(1000)

Fig. 4f

| 454 | | |
|---|---|---|
| KEYWORD | JOB_ROLE | URL |
| XML | DBA | HTTP://WWW.COMPANY.COM/XML |

| 464 | | |
|---|---|---|
| TYPE | NOTE | API |
| R1 | DOCUMENTATION FOR | HTTP://TAHITI.ORACLE.COM/SEARCH?TERM= |

Fig. 4i

```
                    466
                XML FORMAT

<?xml version="1.0"?>
    <equivalence>
        <term>XML</term>
        <term>eXtensible Mark-up Language</term>
        <term>EXTENSIBLE MARKUP LANGUAGE</term>
        <term>eXtensible mark up language</term>
    </equivalence>
```

Fig. 4j

| 468 ||||||||| 
|---|---|---|---|---|---|---|---|---|
| KEY | EQUIVALENCE | R1 | R2 | R3 | R4 | R5 | R6 | R7 |
| XML | `<?xml version="1.0"?>`<br>`  <equivalence>`<br>`    <term>XML</term>`<br>`    <term>eXtensible Mark-up Language`<br>`    </term>`<br>`    <term> EXTENSIBLE MARKUP LANGUAGE`<br>`    </term>`<br>`    <term>extensible mark up language`<br>`    </term>`<br>`  </equivalence>` | NULL | NULL | NULL | NULL | NULL | NULL | NULL |

Fig. 4k

| 470 | | | | | | | | |
|---|---|---|---|---|---|---|---|---|
| KEY | EQUIVALENCE | R1 | R2 | R3 | R4 | R5 | R6 | R7 |
| XML | `<?xml version="1.0"?>`<br>`<equivalence>`<br>   `<term>XML</term>`<br>   `<term>eXtensible Mark-up Language`<br>`</term>`<br>   `<term>EXTENSIBLE MARKUP LANGUAGE`<br>`</term>`<br>   `<term>extensible mark up language`<br>`</term>`<br>`</equivalence>` | T | T | F | F | T | F | T |

SYSTEM AND METHOD FOR SEARCH AND RECOMMENDATION BASED ON USAGE MINING

FIELD OF THE INVENTION

The present invention relates to performing a search for information resulting in the retrieval of recommendations relating to a search query string based on users search query logs and user profile data, query expansion and searching based on the expanded query, and thematic clustering of the search results.

BACKGROUND OF THE INVENTION

The World Wide Web (Web) has become a useful tool for researching and obtaining information. In order to obtain useful information using the Web, information must be accessed, typically using search tools. The process of accessing information on the Web is a task that requires tools, which not only find and retrieve meaningful information for a given query, but also present it to the user in a comprehensive manner. Stated another way, information access has two main components: 1) search and retrieve a result set and 2) visualization (analysis and synthesis) of the result set. Lately there has been a growth in the number of tools and applications in the information retrieval area that attempt to make the process of information access easier for users. However, problems arise with these tools and applications. One such problem involves how to construct a good query to submit to the search system. Another such problem involves how to obtain and synthesize a relevant and manageable set of answers. Current system do not provide an integrated solution, which adequately addresses these problems.

A need arises for a technique by which improved queries can be constructed, meaningful and relevant information can be retrieved by those queries, and the retrieved information can be presented to the user in a useful and comprehensive manner.

SUMMARY OF THE INVENTION

The present invention is a method, system, and computer program product for performing searches that generates expanded queries, retrieves meaningful and relevant information, and presents the retrieved information to the user in a useful and comprehensive manner. The present invention performs a search that involves three searching steps: the retrieval of recommendations relating to a search query string based on users search query logs and user profile data, query expansion and searching based on the expanded query, and thematic clustering of the search results.

The method of searching comprises the steps of: receiving from a user a search query requesting information, retrieving at least one recommendation relating to the search query, generating an expanded query based on the received query, performing a search using the expanded query to retrieve documents, and generating themes relating to the retrieved documents.

In one aspect of the present invention, the recommendation relating to the search query is based on users search query logs and search pattern information. The recommendation may further be based on user profile information. The user profile information may comprise aggregate information.

In one aspect of the present invention, at least one recommendation relating to the search query is retrieved from a recommendation database. The recommendation database is generated by performing the steps of: performing data mining using users search query logs, user search patterns, and user profile information to generate a plurality of recommendations relating to search query strings, generating a data structure including the recommendations relating to search query strings, and generating a text index based on information in the data structure. The step of generating a data structure including the recommendations relating to search query strings comprises the steps of: populating an initial data structure with recommendations relating to search query strings, including an equivalence table comprising a plurality of terms and/or phrases and equivalents thereof, converting the plurality of terms and/or phrases and equivalents thereof to eXtensible Markup Language format, and validating availability of the recommendations.

In one aspect of the present invention, the step of retrieving at least one recommendation relating to a search query string comprises the steps of: parsing the received search query to generate a search query string, searching the populated data structure using the search query string to find a key associated with at least one recommendation relating to the search query string, and retrieving the at least one recommendation relating to the search query string using the key.

In one aspect of the present invention, the step of retrieving at least one recommendation relating to a search query string comprises the steps of: parsing the received search query to generate a search query string, searching the populated data structure using the search query string to find a key associated with at least one recommendation relating to the search query string, and if the key is found, retrieving the at least one recommendation relating to the search query string using the key, and searching the equivalence table of the populated data structure using the search query string to find an alternative key associated with at least one recommendation relating to the search query string, and retrieving the at least one recommendation for information using the alternative key, if the key is not found.

BRIEF DESCRIPTION OF THE DRAWINGS

The details of the present invention, both as to its structure and operation, can best be understood by referring to the accompanying drawings, in which like reference numbers and designations refer to like elements.

FIG. 4b is an exemplary format of a schema shown in FIG. 4a.

DETAILED DESCRIPTION OF THE INVENTION

The present invention is a method, system, and computer program product for performing searching that generates improved queries, retrieves meaningful and relevant information, and presents the retrieved information to the user in a useful and comprehensive manner. The present invention performs a search that involves three searching steps: the retrieval of recommendations relating to a search query string based on users search query logs and user profile data, query expansion and text searching based on the expanded query, and thematic clustering of the search results.

The present invention provides benefits, such as:

Increased user experience and customer satisfaction by providing search results, which are extracted from data mining of search query logs.

Personalized information, which allows user to get 'search trends' based on a user community.

Partition of the search space by presenting search results in an easy to navigate multi-tier search architecture.

Extensible search architecture.

The present invention takes advantage of search patterns and user profile data. The present invention performs one search that involves the execution of three subsystems: the recommendation system, the cluster algorithm, and the generic search. The returned result set consists of the following three-tiers:

1. The first tier is a recommendation system that automatically recommends alternative (to main search) search results, which are based on users search patterns contained in users search query logs and are personalized based on profile information of the particular user. The user's profile information is never revealed, which ensures safety and protects the user's privacy.

2. The second tier is a cluster of themes that describes the set of documents that appears on the web page. The aim here is to present the overall thematic overview of the document set.

3. The third tier is the results of a query expansion to the search application, such as those which are currently used.

Figure 1:
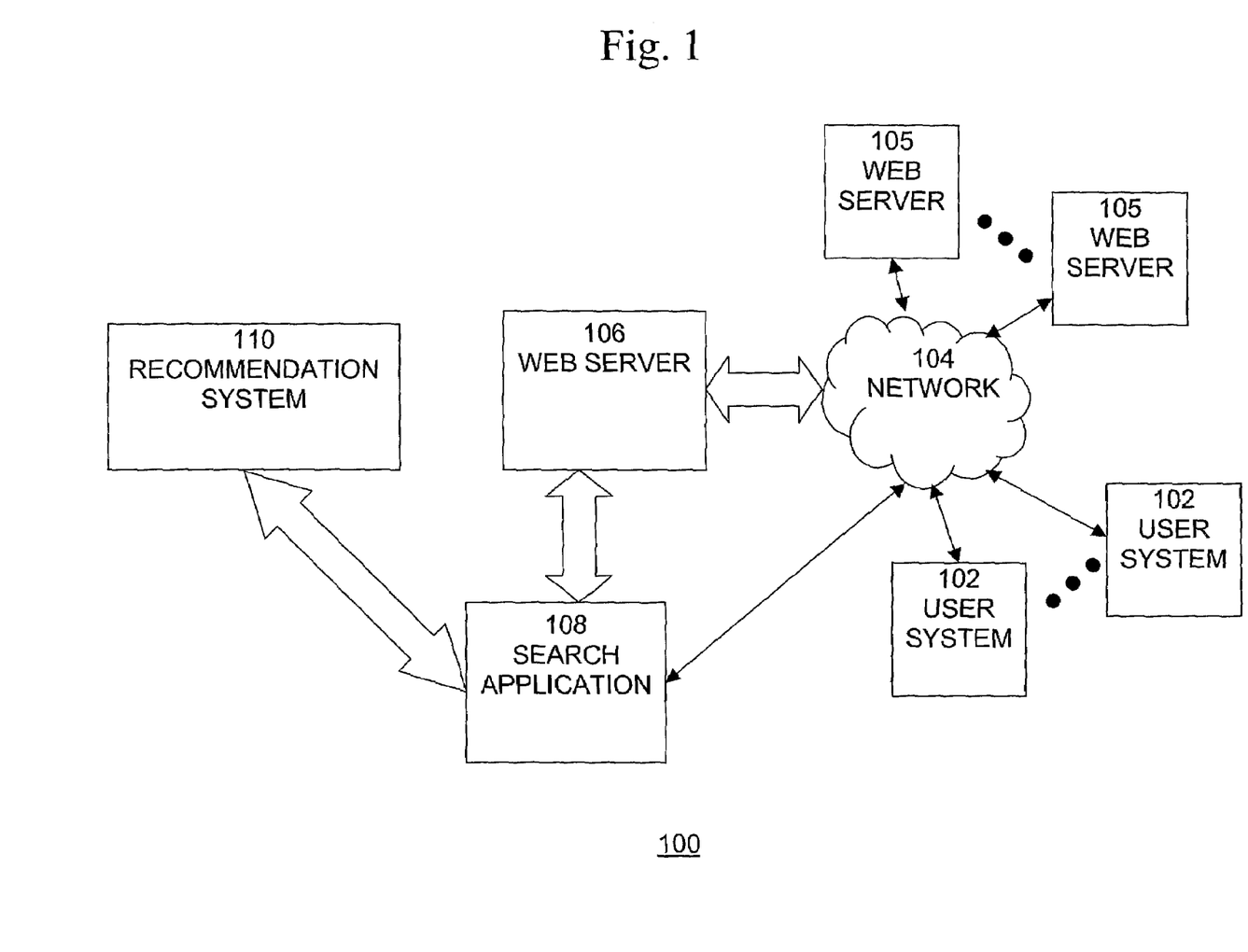
FIG. 1 is an exemplary block diagram of a system 100 incorporating the present invention.

An exemplary block diagram of a system 100 incorporating the present invention is shown in FIG. 1. System 100 includes a plurality of user systems 102, such as personal computer systems operated by users, which are communicatively connected to a data communications network 104, such as a public data communications network, for example, the Internet, or a private data communications network, for example, a private intranet. User systems 102 generate and transmit requests for information over Internet/intranet 104 to Web servers, such as Web servers 105 and Web server 106. Web servers are computers systems that are communicatively connected to a data communications network, such as Internet/intranet 104, which store and retrieve information and/or perform processing in response to requests received from other systems. Typically, the requests for information or processing are generated by a Web browser software running on user systems 102 in response to input from users. The requests for information or processing that are received, for example, by Web server 106 are processed and responses, typically including the requested information or results of the processing, are transmitted from Web server 106 to the user systems.

Search application 108 is communicatively connected to Web Server 106 and performs searches for information that is stored on Web servers that are communicatively connected to Internet/intranet 104, such as Web servers 105. Search application 108 performs searches in response to search queries that are received from user systems 102, via Web server 106. Recommendation system 110 is communicatively connected to search application 108 and receives from search application 108 information relating to the requests for information received by Web server 106 from the user systems 102. When necessary, search application 108 communicates with recommendation system 110 to obtain recommendations for information requested by search application 108. The information received by recommendation system 110 may include the actual requests for information, other information relating to the requests that have been processed or generated by Web server 106, requests for information generated by Web server 106, the actual search queries, and the actual search results. Recommendation system 110 processes the received information and responds appropriately. For example, if the received information is requests from user systems 102 or information relating to those requests, recommendation system 110 may store the information in a database and/or perform data mining in a database to extract appropriate information. Likewise, if the received information includes a request for information generated by web server 106, recommendation system 110 will typically perform data mining in a database to extract information responsive to the requests.

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated by based on one or more data analysis algorithms. Initially, the models are "untrained", but are "trained" by processing training data and generating information that defines the model. The generated information is then deployed for use in data mining, for example, by providing predictions of future behavior based on specific past behavior.

Figure 2:
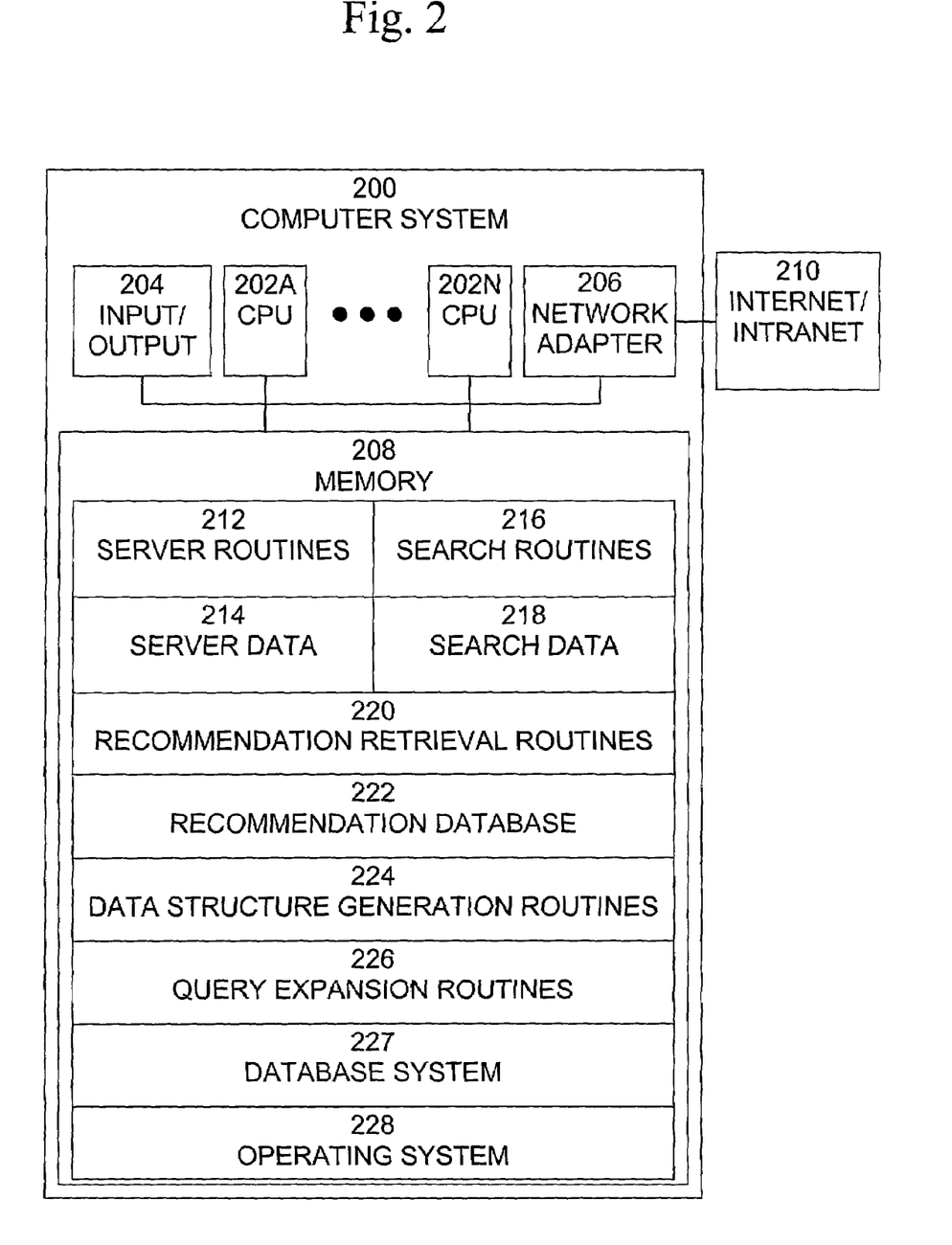
FIG. 2 is an exemplary block diagram of a computer system, such as a Web server, a search application, and/or a recommendation system, which are shown in FIG. 1.

An exemplary block diagram of a computer system 200, such as Web server 106, search application 108, and/or recommendation system 110, shown in FIG. 1, is shown in FIG. 2. System 200 is typically a programmed general-purpose computer system, such as a personal computer, workstation, server system, and minicomputer or mainframe computer. System 200 includes one or more processors (CPUs) 202A–302N, input/output circuitry 204, network adapter 206, and memory 208. CPUs 202A–302N execute program instructions in order to carry out the functions of the present invention. Typically, CPUs 202A–202N are one or more microprocessors, such as an INTEL PENTIUM® processor. FIG. 2 illustrates an embodiment in which System 200 is implemented as a single multi-processor computer system, in which multiple processors 202A–202N share system resources, such as memory 208, input/output circuitry 204, and network adapter 206. However, the present invention also contemplates embodiments in which System 200 is implemented as a plurality of networked computer systems, which may be single-processor computer systems, multi-processor computer systems, or a mix thereof.

Input/output circuitry 204 provides the capability to input data to, or output data from, database/System 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces database/System 200 with Internet/intranet 210. Internet/intranet 210 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of system 200. Memory 208 may include electronic memory devices, such as random-access memory (RAM), 110 read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 208 varies depending upon the function that system 200 is programmed to perform. In the example shown in FIG. 2, memory contents that would be included in Web server 106, search application 108, and recommendation system 110 are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 2, memory 208 includes server routines 212, server data 214, search routines 216, search routines 218, recommendation generation routines 220, recommendation database 222, data structure generation routines 224, query expansion routines 226, and operating system 228. Server routines 212 include software that implements the functionality of web server 106, shown in FIG. 1. This functionality includes receiving requests for information from other systems on the Internet, or an intranet, and transmitting the requested information. Server data 214 includes the information that might be requested. Search routines 216 includes software that implements the functionality of search application 108, shown in FIG. 1. This functionality includes searching documents for specified keywords and returns a list of the documents where the keywords were found. Typically, a search application works by sending out a spider to fetch as many documents as possible. Another program, called an indexer, then reads these documents and creates a text index based on the words contained in each document. This index is included in search data 218.

Recommendation generation routines 220 include software that implements a recommendation generation process. The recommendation retrieval process uses the data stored in recommendation database 222 to retrieve recommendations for alternative search results. The retrieved recommendations are based on search patterns of users of the system, as contained in users search query logs, and are personalized based on profile information for the user. Data structure generation routines 224 include software that implements the generation of data structures used by the present invention. The generation of these data structures uses user data, such as the information relating to the query and other information relating to the user, and search data, such as logs of searches that have been performed, to generate data structures, termed schema, which are stored in recommendation database 222, and which are used to retrieve recommendations for alternative search results. Query expansion routines 226 include software that generates an expanded query, which is an enhanced text query that will typically cause improved search results to be retrieved compared to the original query. Database system 227 provides storage mechanism for search application. Operating system 228 provides overall system functionality.

As shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 3:
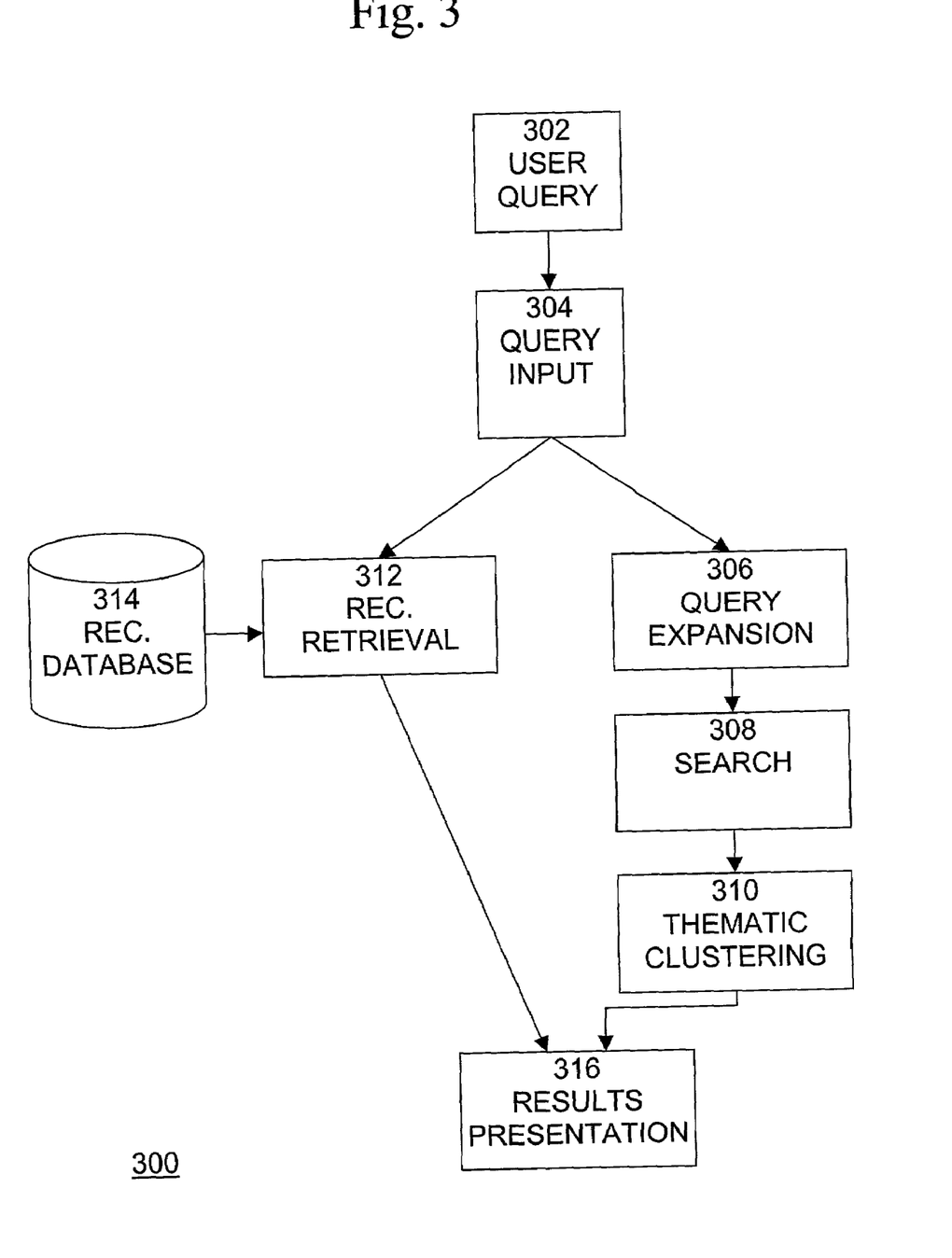
FIG. 3 is an exemplary flow diagram of a process of operation of the present invention.

An exemplary flow diagram of a process of operation 300 of a search application, shown in FIG. 1, is shown in FIG. 3. The process begins with step 302, in which a user query, which is a request for information, is received. Typically, the user query is received from a personal computer system operated by a user over a data communications network, such as the Internet, or an intranet. In step 304, the received user query is input to the query processing performed by the present invention. In particular, three forms of processing are performed on the query: query expansion and searching in steps 306 and 308, respectively, thematic clustering of the search results found in step 308 in step 310, and retrieval of recommendations for alternate search results in step 312.

In step 306, the query is expanded to form an enhanced text query, which will typically cause improved search results to be retrieved compared to the original query. In step 308, the expanded query is used to perform a search for documents that are present on the Internet/intranet. The documents that are found by the search are sorted based on a scoring function, such as the relevance of each document to the query. In step 310, the document that were found in step 308 are organized to form clusters of documents based on themes found in the documents. To construct the clusters, a linguistic analysis of the documents is performed to generate themes that describe the documents. Representative themes for the set of documents are then selected from among the generated themes. This allows presentation of the overall thematic overview of the document set.

In step 312, the query is input to a recommendation retrieval process, which uses the data stored in recommendation database 314 to generate recommendations for alternative search results. The generated recommendations are based on search patterns of users of the system, as contained in users search query logs, and are personalized based on profile information for the user. The user's profile is never revealed, which ensures safety and protects user's privacy.

In step 316, the results generated in step 308, 310 and 312 are presented to the user who input the original query. The results are presented in the form of tiers of information, such as:

1. The first tier presents the recommendations for alternative search results generated in step 312.

2. The second tier presents the thematic clusters generated in step 310.

3. The third tier presents the results of the search that was performed using the expanded query in step 308.

Figure 4A:
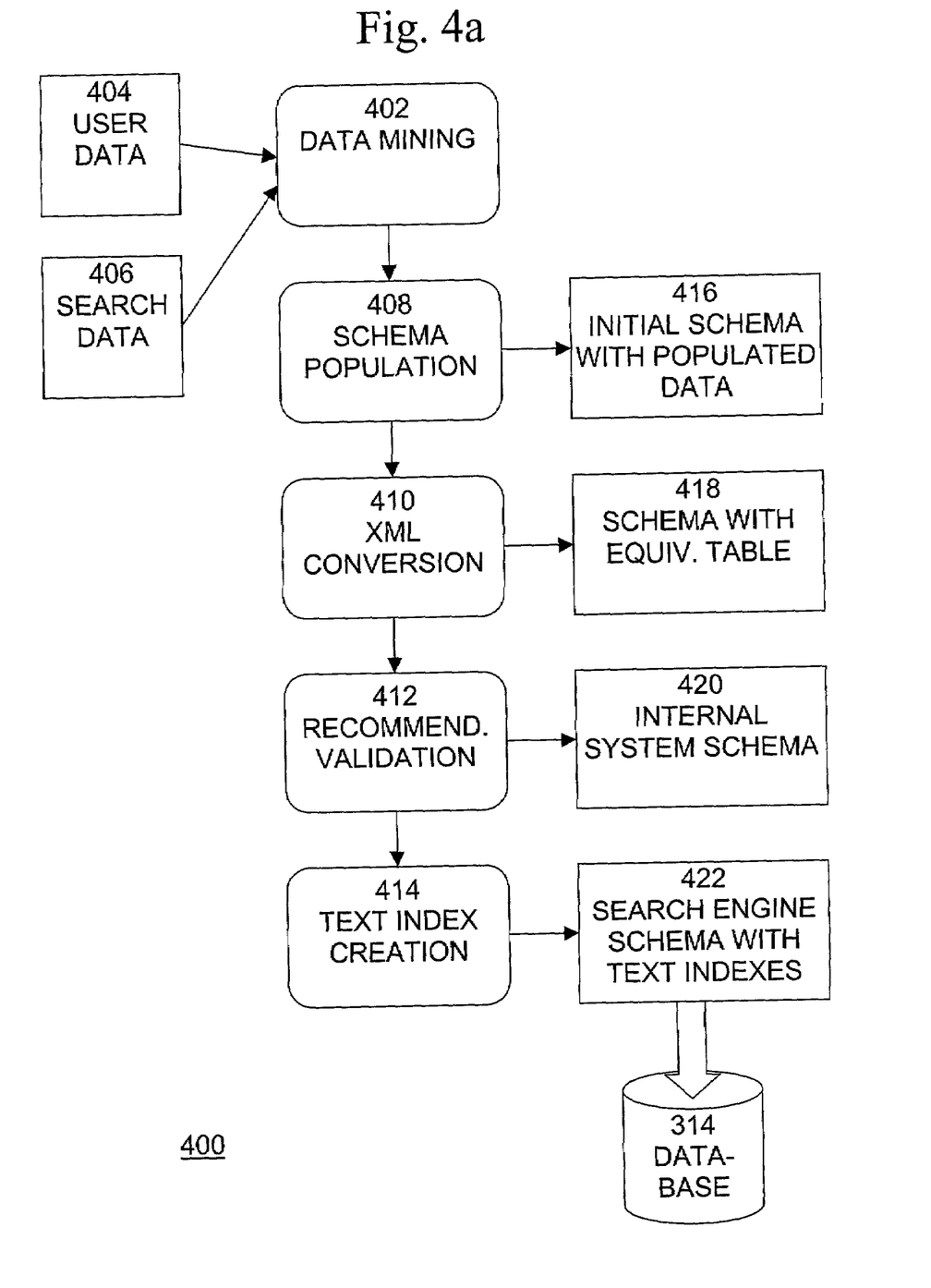
FIG. 4a is an exemplary flow diagram of a data structure generation process step shown in FIG. 3.

An exemplary data flow diagram of a data structure generation process 400, which generates recommendation database 314, shown in FIG. 3, is shown in FIG. 4a. The process begins with step 402, in which data mining is performed using user data 404 and search logs 406. User data 404 includes information relating to users of the system, such as user profile information and user preferences. Search data includes information relating to searches that have been performed by the system, such as logs of the searches that have been performed. For example, selected activities of a user in the system are recorded in different log files depending on the type of activity. There are pure navigational activities (click analysis), such as a search where the text search query expression is recorded along with the number of documents that were returned and a time stamp. In addition to this, the document that was selected from the documents returned by the search (the result set), and the location of the document in the result set, are recorded.

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated by based on one or more data analysis algorithms. Initially, the models are "untrained", but are "trained" by processing training data and generating information that defines the model. The generated information is then deployed for use in data mining, for example, by providing predictions of future behavior based on specific past behavior.

The output of data mining step 402 is recommendations for Web documents that users may be interested in. These recommendations are based on information that describes search patterns, which are personalized, based on a user job role, such as Developer, OBA, IT Manager etc., and other user profile data. The recommendations are organized into data sets that are relate to criteria such as:

What are the top web sites or documents for a given search expression?

What are the top web sites or documents for a search expression for a given user job role?

What are the top web sites or documents for a search expression by an industry type with which a user may identify his or her company?

The remaining steps of the process implement a pipeline process that applies changes and modifications to the initial set of recommendation data sets. The pipeline process produces a data structure that is a valid schema of recommendation data, which is then used to perform the recommendation retrieval step shown in FIG. 3. The pipeline process contains four main sub process steps: step 408, schema population, step 410 XML conversion, step 412, services and recommendations validation, and step 414, text index creation. Step 408 generates the initial populated data schema 416. Included in schema 416 are a variety of data objects that include data relating to users and to searches that have been performed. For example, one of the schema objects is an equivalence table that stores frequent text query expressions and synonyms. For example, the equivalence table may store 'XML' as the main text query expression and 'eXtensible Markup Language' as synonym of XML. In step 410, the equivalence table is used by an XML conversion process, which converts synonyms in a XML format that will be used to generate text indexes in step 414.

In step 412, recommendations that were generated in step 402 are validated. The system enables integration of different recommendations and checks the availability and completeness of the Web documents included in the recommendations. If for some reason a recommendation is not available or the returned information is not correct, the invention will not include that recommendation. The output of recommendation validation process is the internal system schema 420.

Once the validation process is done, in step 414, a full text index is created based on some of the text columns that are included in the schema, specifically internal system schema 420. The full text index is integrated with the schema to form a schema with text indexes 422, which is stored in recommendation database 314.

Figure 4B:
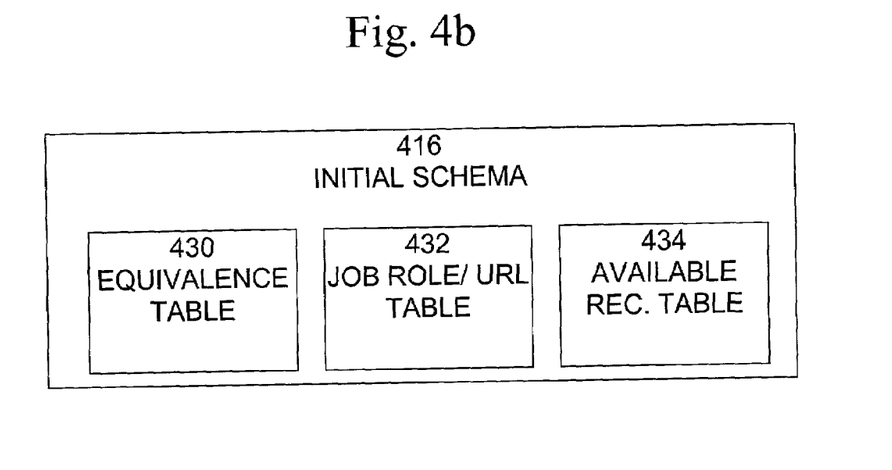

The output from schema population step 408 is initial schema 416. An example of schema 416 is shown in FIG. 4b. In this example, schema 416 includes three tables, equivalence table 430, job role/URL table 432, and available recommendation table 434. Equivalence table 430 includes information about terms or phrases that may be used to perform searches and equivalent terms or phrases. Job role/URL table 432 includes information relating to job roles of users of the search system of the present invention. Available recommendation table 434 includes information about the types and names of available recommendations.

Figure 4C:
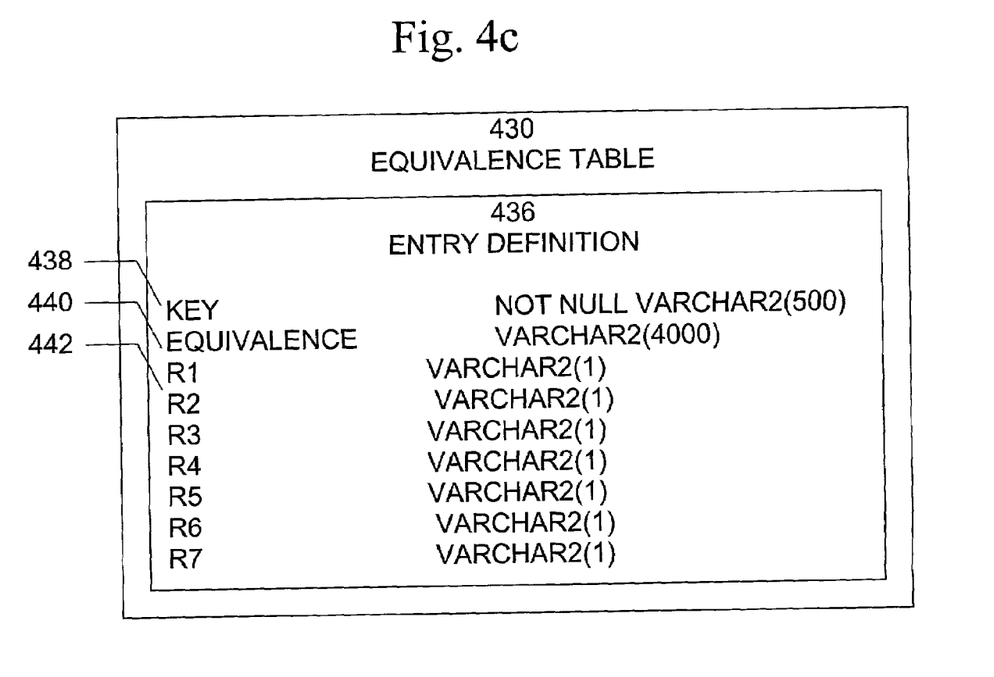
FIG. 4c is an example of a definition of an entry in an equivalence table shown in FIG. 4b.
Figure 4D:
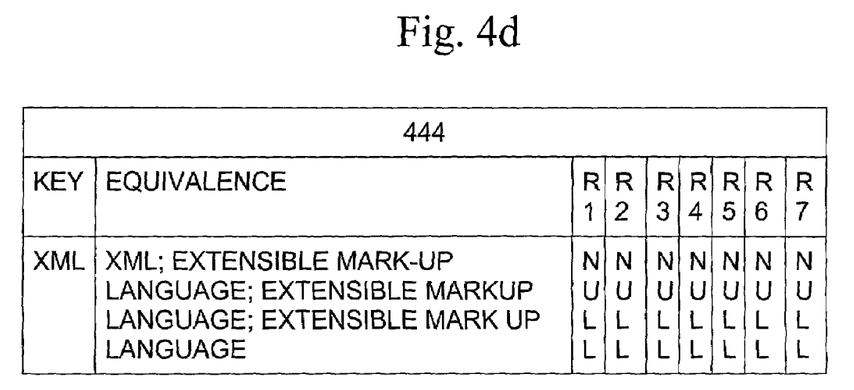
FIG. 4d is an example of an entry in the equivalence table shown in FIG. 4b.

An example of a definition 436 of an entry in equivalence table 430 is shown in FIG. 4c. Entry definition 436 includes a key field 438, an equivalence field 440, and seven recommendation availability fields 442. Although in FIG. 4c seven recommendation fields are shown, one of skill in the art would recognize that any number of recommendation fields may be used. The key field 438 contains the primary key for the table and identifies a term or a phrase. The equivalence field 440 may contain one or more terms or phrases that are equivalent to the key term or phrase. The recommendation availability fields 442 indicate any recommendations related to the key phrase or term that may be available. The recommendation fields may contain TRUE-FALSE values that indicate whether each recommendation is available, or other well-known indication schemes may be used. An example of an entry 444 in equivalence table 430 is shown in FIG. 4d. Entry 444 includes values for the key field, the equivalence field, and the recommendation availability fields, as shown.

Figure 4E:
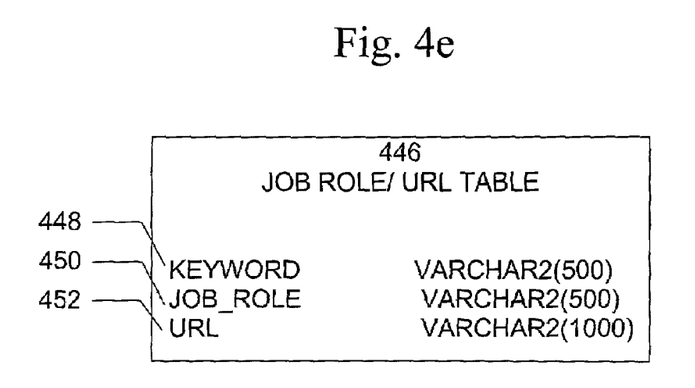
FIG. 4e is an example of a definition of an entry in a job role/URL table shown in FIG. 4b.
Figure 4F:
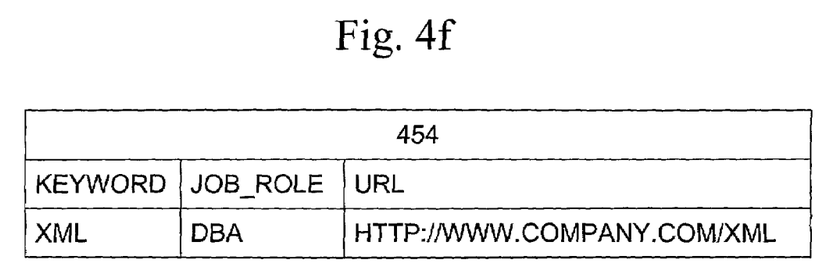
FIG. 4*f* is an example of an entry in the job role/URL table shown in FIG. 4*b*.

An example of a definition 446 of an entry in job role/URL table 432 is shown in FIG. 4e. Entry definition 446 includes a keyword field 448, a job role field 450, and a uniform resource locator (URL) field 452. The keyword field 448 contains a term or phrase similar to the term or phrase contained in key field 438 of equivalence table entry definition 436. Job role field 450 contains information relating to the types of user job roles that may use the present invention. URL field 452 contains one or more URLs that are associated with the keyword and job role in the entry. An example of an entry 454 in job role/URL table 432 is shown in FIG. 4f. Entry 438 includes values for the key field, such as "XML", the job role field, such as "DBA", and the URL field, such as the URL shown.

Figure 4G:
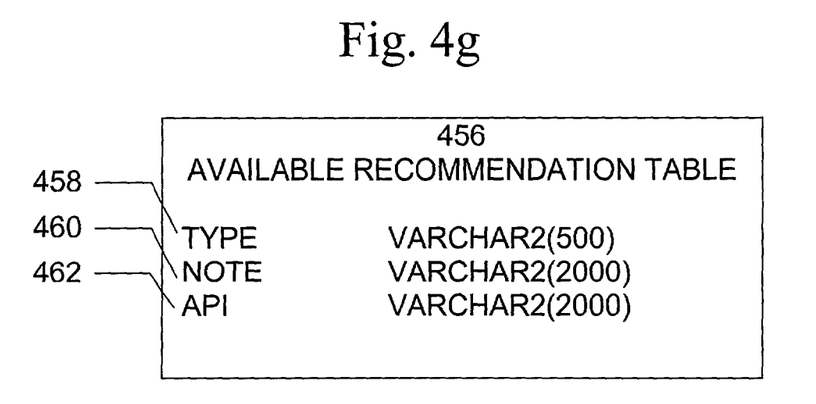
FIG. 4*g* is an example of a definition of an entry in an available recommendation table shown in FIG. 4*b*.
Figure 4H:
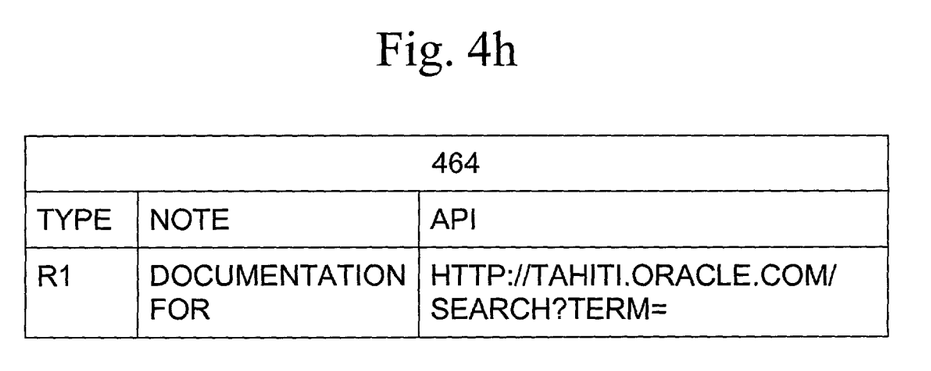
FIG. 4*h* is an example of an entry in the available recommendation table shown in FIG. 4*b*.

An example of a definition 456 of an entry in available recommendation table 434 is shown in FIG. 4g. Entry definition 456 includes type field 458, note field 460, and API field 462. Type field 458 contains information indicating a type of the recommendation associated with the entry. Note field 460 contains any notes or comments relating to the recommendation associated with the entry. API field 462 contains information that allows the recommendation to be obtained. An example of an entry 464 in available recommendation table 434 is shown in FIG. 4h. Entry 464 includes values for the type field, the notes field, and the API field, as shown.

In the described example of schema 416, the summarized data inside the schema does not contain any individual information, but rather information is only stored in aggregated form independently of any individual. This arrangement is preferred as it provides protection for the privacy of individual that may use the present invention. However, the present invention contemplates other architectures for the schema and some of these architectures may store individual data.

Figure 4I:
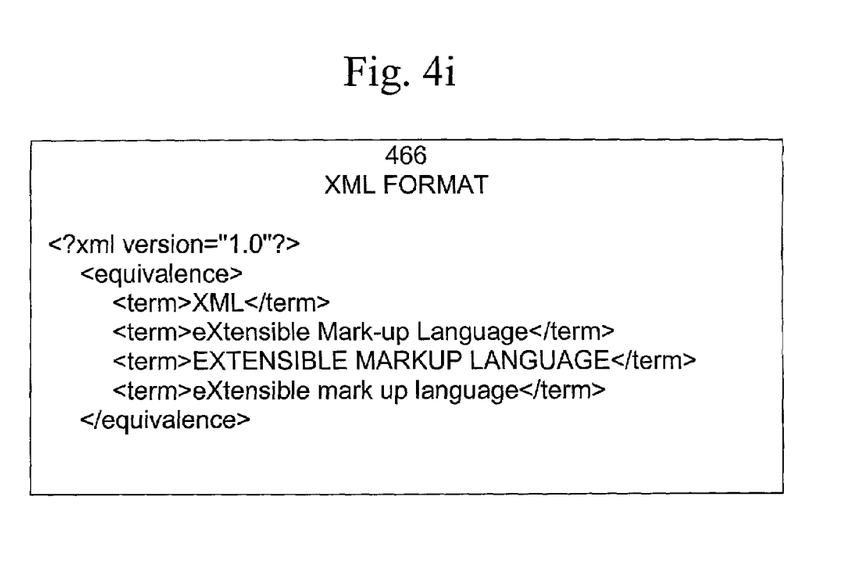
FIG. 4*i* is an example of equivalence information in XML format.
Figure 4J:
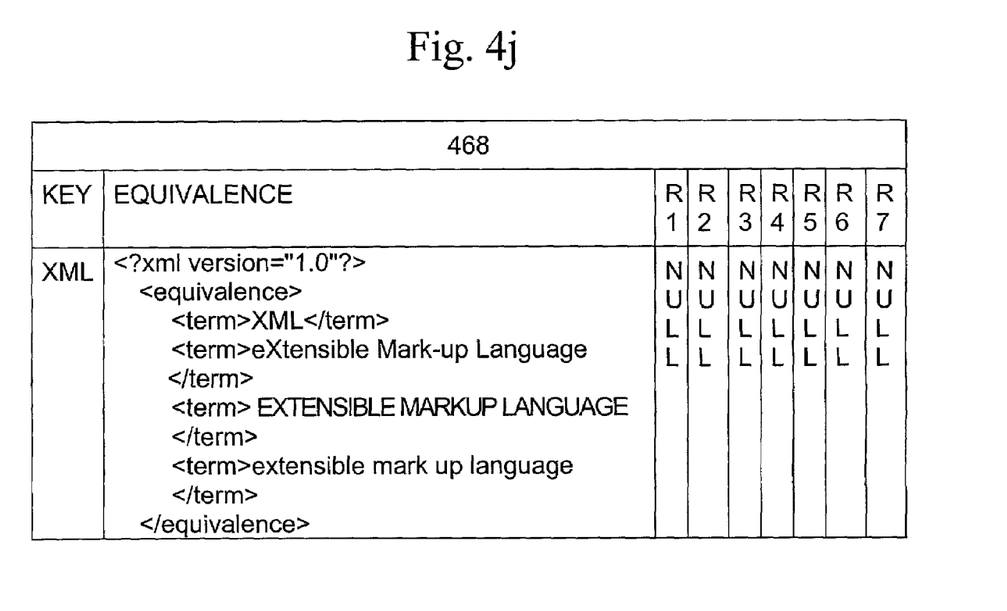
FIG. 4*j* is an example of an entry in the equivalence table shown in FIG. 4*b* that has been populated with XML data.

In step 410 of FIG. 4a, the equivalence table is used by an XML conversion process, which converts synonyms in an XML format and populates initial schema 416 with this XML data to form schema 418. An example of equivalence information in XML format 466 that may be used is shown in FIG. 4i. An example of an entry 468 in equivalence table 430 that has been populated with XML data is shown in FIG. 4j. Entry 468 includes values for the key field, the equivalence field, and the recommendation availability fields, as shown. The equivalence field has been populated with XML data describing the equivalent terms or phrases.

Figure 4K:
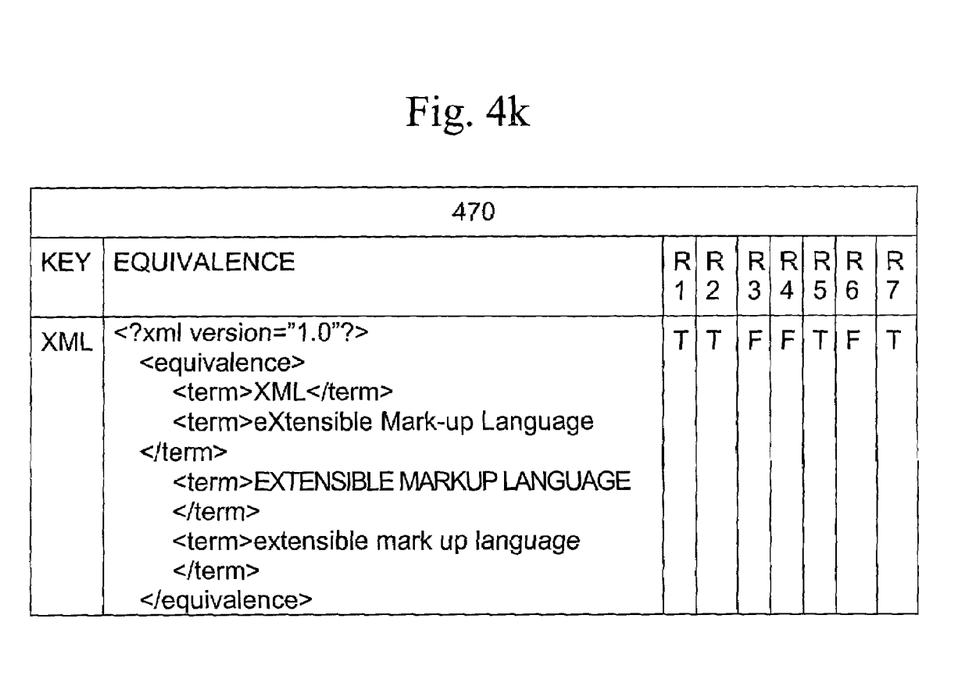
FIG. 4*k* is an example of an entry in the equivalence table shown in FIG. 4*b* including recommendations validation data.

In step 412 of FIG. 4a, recommendations that were generated in step 402 are validated. The availability of the recommendation APIs stored in available recommendation table 434 is verified. The system enables integration of different recommendations and checks the availability and completeness of the Web documents included in the recommendations. If a document is validated, then in the exemplary equivalence table entry 470 shown in FIG. 4k, the value "TRUE" is entered for that recommendation. If for some reason a recommendation is not available or the returned information is not correct, then in the exemplary equivalence table entry 470, the value "FALSE" is entered for that recommendation.

The output of recommendation validation process is the internal system schema 420.

Once the validation process is done, in step 414, a full text index is created based on some the text columns that are included in the schema, specifically internal system schema 420. For example, in an implementation in which a 'Object Relational Database (ORDMBS)' is used, the text index may be created using structured query language (SQL) statements such as:

```
begin
        ctx_ddl.create_section_group
            (
                group_name = 'rec_section_group',
                group_type = 'auto_section_group'
            ) ;
    end;
    /
    create index text_index on
equivalence_table (equivalence)
    indextype is ctxsys.context
    parameteres ('section group rec_section_group') ;
```

The full text index is integrated with the schema to form a schema with text indexes 422, which is stored in recommendation database 314.

Figure 5:
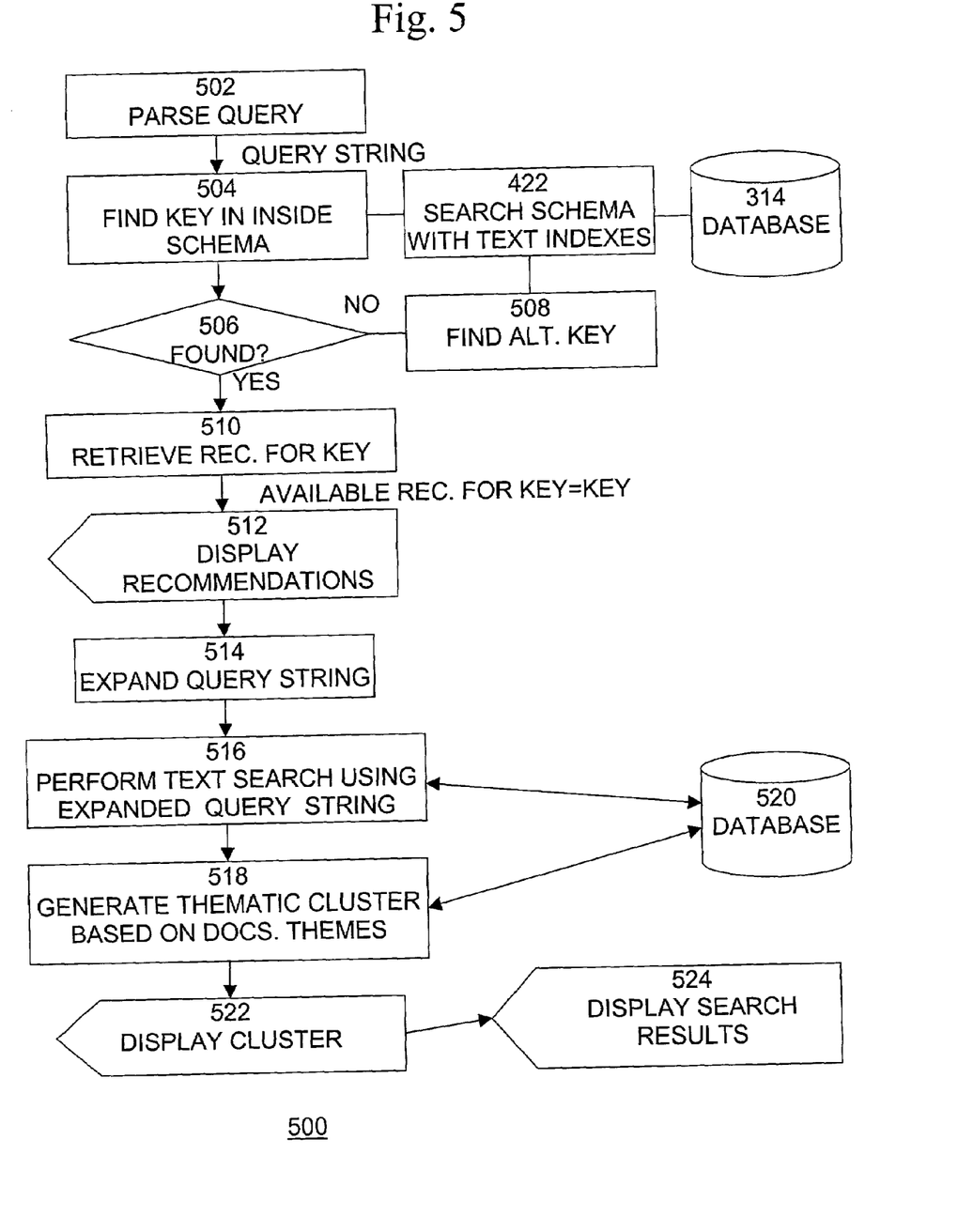
FIG. 5 is an exemplary data flow diagram of a search application process step shown in FIG. 3.

An exemplary data flow diagram of a search application including recommendation retrieval process 500, which is performed in step 312 of FIG. 3, is shown in FIG. 5. The process begins with step 502, in which the user query is parsed to generate a query string that does not contain 'noise words' such as '$' and 'stop words' such as 'the'. The query string generated in step 502 is then used in step 504, in which search application schema with text indexes 422 stored in recommendation database 314 is accessed using the query string. In step 506 it is determined whether the query string was found in schema 422. If the query string was found, then a key indicating the location of the components and their associated recommendations in the schema is returned. If the components are not located, then, in step 506, an alternative key is located in an equivalence table in schema 422 and a key associated with the alternative key that indicates the location of associated recommendations is returned.

In step 510, the available recommendations that are associated with the key that was returned in step 506 or 508 are retrieved. In step 512, the derived recommendations are output for display to the user. This is followed by step 514 where parsed query string from 502 is expanded using several text search operators that will precision and recall. In step 516, text search is carried out against a document database 520 using expanded query string from step 514. In step 518, the thematic clusters are generated using linguistic extraction features for documents retrieved in step 516. Thematic clusters are then displayed to user in step 522 and documents from step 516 relating to user query strings are displayed to user in step 524.

Figure 6:
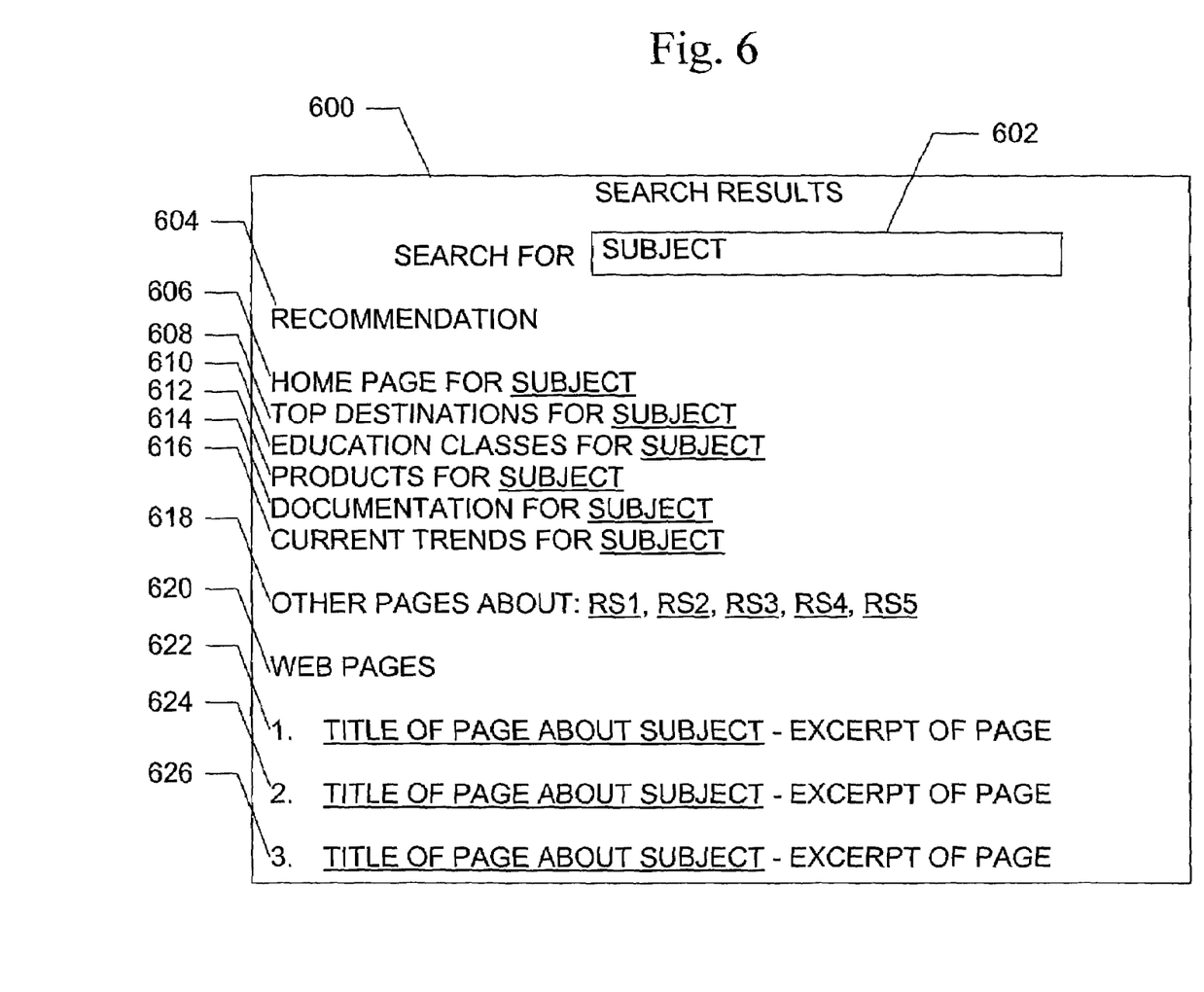
FIG. 6 is an exemplary presentation of search results generated by the process shown in FIG. 3.

An exemplary presentation 600 of search results generated by the process shown in FIG. 3 is shown in FIG. 6. Presentation 600 includes query box 602, which displays the user query that was entered to initiate the search. Presentation 600 includes a first tier of results called recommendation 604 which can include links to home pages 606 related to the subject of the query, links to top destinations 608 related to the subject of the query, links to education classes 610 related to the subject of the query, links to products 612 related to the subject of the query, links to documentation 614 related to the subject of the query, and links to current trends 616 related to the subject of the query. Presentation 600 includes a second tier of results, which includes links to other pages 618, which refer to other subjects that are related to the subject of the query. Thematic clustering performed in step 310 of FIG. 3 develops the other subjects. Presentation 600 also includes links 622, 624, and 626, to Web pages that are were found by the expanded text search in step 308 of FIG. 3.

The first tier shows recommendations available for the subject of the query that was entered. A search relating to the subject of the query is performed in the internal system schema to retrieve the recommendations. The recommendations are organized into categories and links to the Web pages in the categories are presented. In this particular example there are five recommendations:

Home Page links 606 provides links to the official Home page (or root page) for a particular asset (e.g. a product, a concept, a paper, etc.)

Top Destinations links 608 provides links to the top destinations (most popular current destinations) for an asset using real time data from the Internal system schema.

Education Classes links 610 provides links to classes relating to the subject of the search.

Products links 612 provides links to a store or stores, which provides the capability for the user to buy products.

Documentation links 614 provides links to a reference document search relating to the subject of the query.

Current Trends links 616 provides links to activity summaries of a user's peer group, such as that defined by a user's job role. This recommendation is for registered users only since it uses user profile information. If an unregistered user selects this link, the user is given an option to register. User profile data is not revealed.

The second tier, other pages links 618, presents a cluster of themes based on documents to be presented in third tier. To construct the cluster, the invention performs a linguistic analysis that generates themes that best describes the document. The cluster algorithm then selects the best themes for the whole set.

The third tier, web pages links 620, presents the web pages that were found by the search performed using the expanded user query in step 316 of FIG. 3. The initial user query is expanded to represent an enhanced text query. The retrieved documents are sorted by quality using a scoring function.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer implemented method of searching comprising the steps of:

receiving from a user a search query requesting information, wherein the query is provided to retrieve at least one recommendation and generate an expanded query;

retrieving the at least one recommendation for alterative search results using the received query, the recommendation based on users search query logs and user search patterns, and user profile information, wherein the at least one recommendation relating to the query is retrieved from a recommendation database, and wherein the recommendation database is generated by performing the steps of:

performing data mining using the users search query logs, the user search patterns, and the user profile information to generate a plurality of recommendations relating to search query strings based on the users search query logs, user search patterns, received query and user profile information, generating a data structure including the plurality of recommendations relating to search query strings, and determining that the at least one recommendation is a valid recommendation in the plurality of recommendations relating to the search query strings;

generating a text index including the at least one valid recommendation;

generating an expanded query using the received query;

performing a search using the expanded query to retrieve documents;

generating thematic clusters relating to the retrieved documents, the thematic clusters generated by performing linguistic analysis of the retrieved documents using linguistic extraction features to generate themes that describe the retrieved documents; and presenting the recommendation for alterative search results, the thematic clusters relating to the retrieved documents, and the retrieved documents.

2. The method of claim 1 wherein the user profile information comprises aggregate information.

3. The method of claim 1, wherein the step of generating a data structure including the recommendations relating to search query strings comprises the steps of:

populating an initial data structure with recommendations relating to search query strings, including an equivalence table comprising a plurality of terms and/or phrases and equivalents thereof;

converting the plurality of terms and/or phrases and equivalents thereof to extensible Markup Language format; and validating availability of the recommendations.

4. The method of claim 3, wherein the step of retrieving at least one recommendation using the received query comprises the steps of:

parsing the received query to generate a search query string;

searching the populated data structure using the search query string to find a key associated with at least one recommendation relating to the search query string; and retrieving the at least one recommendation relating to the search query string using the key.

5. The method of claim 3, wherein the step of retrieving at least one recommendation using the received query comprises the steps of:

parsing the received query to generate a search query string;

searching the populated data structure using the search query string to find a key associated with at least one recommendation relating to the search query string, and if the key is found, retrieving the at least one recommendation relating to the search query string using the key; and searching the equivalence table of the populated data structure using the search query string to find an alternative key associated with at least one recommendation relating to the search query string, and retrieving the at least one recommendation for information using the alternative key, if the key is not found.

6. A system for searching comprising:

a processor operable to execute computer program instructions; and a memory operable to store computer program instructions executable by the processor, for performing the steps of:

receiving from a user a search query requesting information, wherein the query is provided to retrieve at least one recommendation and generate an expanded query;

retrieving the at least one recommendation for alterative search results using the received query, the recommendation based on users search query logs and user search patterns, and user profile information, wherein the at least one recommendation relating to the query is retrieved from a recommendation database, and wherein the recommendation database is generated by performing the steps of:

performing data mining using the users search query logs, the user search patterns, and the user profile information to generate a plurality of recommendations relating to search query strings based on the users search query logs, user search patterns, received query and user profile information, generating a data structure including the plurality of recommendations relating to search query strings, and determining that the at least one recommendation is a valid recommendation in the plurality of recommendations relating to the search query strings;

generating a text index including the at least one valid recommendation;

generating an expanded query using the received query;

performing a search using the expanded query to retrieve documents;

generating thematic clusters relating to the retrieved documents, the thematic clusters generated by performing linguistic analysis of the retrieved documents using linguistic extraction features to generate themes that describe the retrieved documents; and presenting the recommendation for alterative search results, the thematic clusters relating to the retrieved documents, and the retrieved documents.

7. The system of claim 6, wherein the user profile information comprises aggregate information.

8. The system of claim 6, wherein the step of generating a data structure including the recommendations relating to search query strings comprises the steps of:

populating an initial data structure with recommendations relating to search query strings, including an equivalence table comprising a plurality of terms and/or phrases and equivalents thereof;

converting the plurality of terms and/or phrases and equivalents thereof to extensible Markup Language format; and validating availability of the recommendations.

9. The system of claim 8, wherein the step of retrieving at least one recommendation using the received query comprises the steps of:

parsing the received query to generate a search query string;

searching the populated data structure using the search query string to find a key associated with at least one recommendation relating to the search query string; and retrieving the at least one recommendation relating to the search query string using the key.

10. The system of claim 8, wherein the step of retrieving at least one recommendation using the received query comprises the steps of:

parsing the received query to generate a search query string;

searching the populated data structure using the search query string to find a key associated with at least one recommendation relating to the search query string, and if the key is found, retrieving the at least one recommendation relating to the search query string using the key; and searching the equivalence table of the populated data structure using the search query string to find an alternative key associated with at least one recommendation relating to the search query string, and retrieving the at least one recommendation for information using the alternative key, if the key is not found.

11. A computer program product for performing a search in an electronic data processing system, comprising:

a computer readable medium;

computer program instructions, recorded on the computer readable medium, executable by a processor, for performing the steps of:

receiving from a user a search query requesting information, wherein the query is provided to retrieve at least one recommendation and generate an expanded query;

retrieving the at least one recommendation for alterative search results using the received query, the recommendation based on users search query logs and user search patterns, and user profile information, wherein the at least one recommendation relating to the query is retrieved from a recommendation database, and wherein the recommendation database is generated by performing the steps of performing data mining using the users search query logs, the user search patterns, and the user profile information to generate a plurality of recommendations relating to search query strings based on the users search query logs, user search patterns, received query and user profile information, generating a data structure including the plurality of recommendations relating to search query strings, and determining that the at least one recommendation is a valid recommendation in the plurality of recommendations relating to the search query strings;

generating a text index including the at least one valid recommendation;

generating an expanded query using the received query;

performing a search using the expanded query to retrieve documents;

generating thematic clusters relating to the retrieved documents, the thematic clusters generated by performing linguistic analysis of the retrieved documents using linguistic extraction features to generate themes that describe the retrieved documents; and presenting the recommendation for alterative search results, the thematic clusters relating to the retrieved documents, and the retrieved documents.

12. The computer program product of claim 11, wherein the user profile information comprises aggregate information.

13. The computer program product of claim 11, wherein the step of generating a data structure including the recommendations relating to search query strings comprises the steps of:

populating an initial data structure with recommendations relating to search query strings, including an equivalence table comprising a plurality of terms and/or phrases and equivalents thereof;

converting the plurality of terms and/or phrases and equivalents thereof to extensible Markup Language format; and validating availability of the recommendations.

14. The computer program product of claim 13, wherein the step of retrieving at least one recommendation recommendations using the received query comprises the steps of:

parsing the received query to generate a search query string;

searching the populated data structure using the search query string to find a key associated with at least one recommendation relating to the search query string; and retrieving the at least one recommendation relating to the search query string using the key.

15. The computer program product of claim 13, wherein the step of retrieving at least one recommendation recommendations using the received query comprises the steps of:

parsing the received query to generate a search query string;

searching the populated data structure using the search query string to find a key associated with at least one recommendation relating to the search query string, and if the key is found, retrieving the at least one recommendation relating to the search query string using the key; and searching the equivalence table of the populated data structure using the search query string to find an alternative key associated with at least one recommendation relating to the search query string, and retrieving the at least one recommendation for information using the alternative key, if the key is not found.

* * * * *